W. EGGERS.
MOLD FOR MAKING RUBBER ARTICLES.
APPLICATION FILED OCT. 14, 1910.
1,049,688.
Patented Jan. 7, 1913.
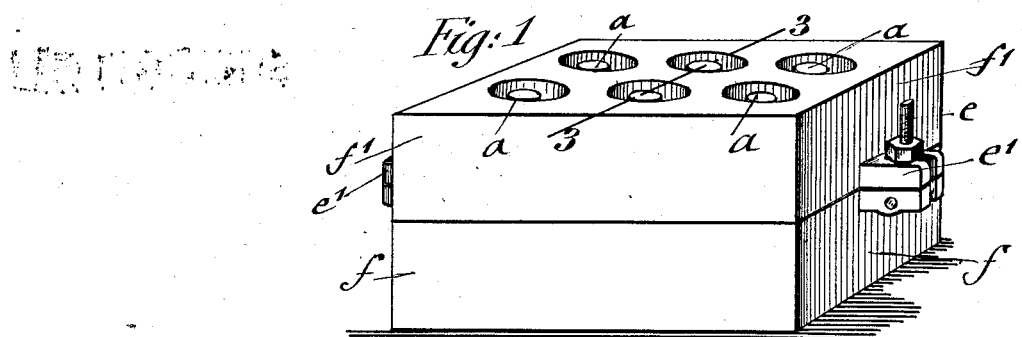
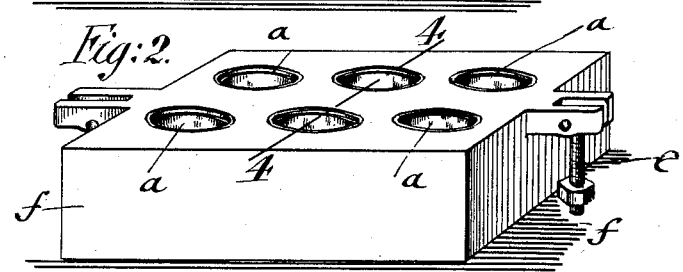
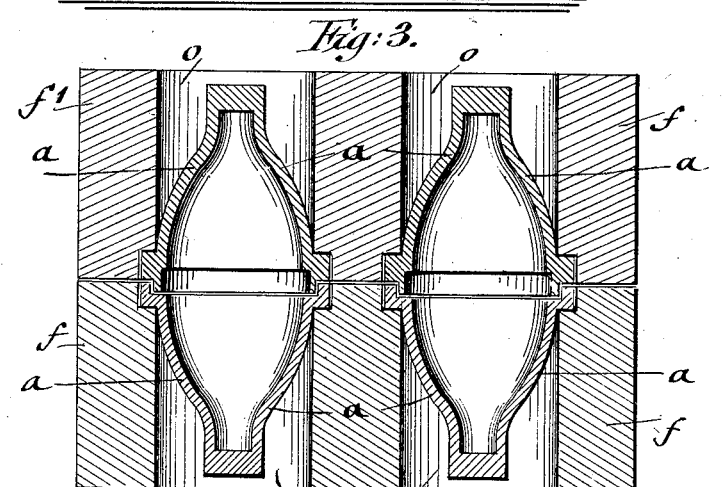
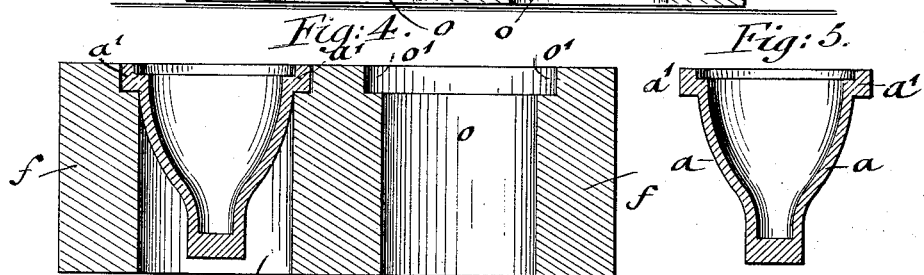
Witnesses:
John Murtagh
N. J. Murphy
Inventor
William Eggers
By his Attorneys

UNITED STATES PATENT OFFICE.

WILLIAM EGGERS, OF NEW YORK, N. Y.

MOLD FOR MAKING RUBBER ARTICLES.

1,049,688.  Specification of Letters Patent.  Patented Jan. 7, 1913.

Application filed October 14, 1910. Serial No. 586,968.

REISSUED

*To all whom it may concern:*

Be it known that I, WILLIAM EGGERS, a citizen of the United States of America, residing in the city of New York, borough of Brooklyn, in the county of Kings and State of New York, have invented certain new and useful Improvements in Molds for Making Rubber Articles, of which the following is a specification.

This invention relates to an improved mold for making rubber articles, and more especially hollow rubber articles, such as bulbs, nipples and the like.

Heretofore, the rubber articles were molded in a solid cast-metal mold, which was provided with a number of cavities, into which the soft rubber was placed in unvulcanized condition and vulcanized in the mold. These molds were made of a solid casting and were heavy and inconvenient in handling.

The object of this invention is to overcome the objection to the molds heretofore used for making hollow rubber articles, furnishing a mold of comparative lightness, which can be easily handled and in which detachable shells, corresponding to the shape of the rubber-articles to be made, are employed and placed into suitable supporting frames having openings for receiving the shells; and for this purpose the invention consists of a mold for making hollow rubber-articles, which comprises a supporting-frame provided with openings, a plurality of soft metal shells inserted into said openings, said shells being made of castmetal and swaged into shape.

The invention consists further in making the shells of cast soft metal swaged into shape.

In the accompanying drawings, Figure 1 represents a perspective view of my improved mold for making hollow rubber-articles; Fig. 2 is a perspective view of the lower section of the mold; Figs. 3 and 4 are vertical transverse sections on line 3—3, Fig. 1, and 4—4, Fig. 2, drawn on a larger scale, and Fig. 5 is a vertical transverse section through one of the shells used in my improved mold.

Similar letters of reference indicate corresponding parts throughout the several figures.

In making my improved mold for rubber-articles, a number of shells $a$ are cast of suitable soft metal, such as tin, type-metal, aluminum or the like, in molds having a number of cavities corresponding to the shells to be produced. After the material of the shells is cooled off, they are removed from the mold and are then placed into a die of corresponding shape, into which a steel-plunger is pressed, so that the soft metal shell is swaged into final shape. After the swaging process, the shell is taken out from the die, being then complete and free from all defects and highly polished, owing to the pressure exerted on the shell during the swaging process. These shells form the essential part of my improved mold. A plurality of shells $a$ are inserted into a frame $f$, which forms the lower section of the mold and which is provided with as many openings as shells $a$ are to be used. The shells of the lower section are seated by their circumferential rims $a'$ into corresponding recesses $o'$ of the supporting frame $f$, around the openings $o$. The shells are preferably spaced at this lower part from the walls of the openings, as shown. A second supporting frame $f'$, forming the upper section of the mold, is provided with the same number of shells which fit on the shells of the lower supporting-frame, as shown in Fig. 2. The upper section is then placed over the shells of the upper and lower frames and locked thereto by means of clamping screws $e$, which are pivoted to the lower sections and are made to engage recessed ears $e'$ at opposite ends of the upper section, so as to lock the molds rigidly together.

Before locking the lower and upper sections of the mold together, the layers of soft unvulcanized rubber are placed on the interior of the shells, both in the female shells of the lower as well as the male shells of the upper frame, the shells of the upper section being placed over the shells of the lower frame, after which the upper frame is placed in position over the upper shells and locked to the lower frame as before described. The mold is then transferred to the vulcanizing oven. After vulcanization the mold can be quickly cooled off, by being submerged in water, and is then taken apart so that the vulcanized articles can be readily removed from the molds.

The advantages of my improved mold are first, that the shells can be removed and replaced at will, and that they are so constructed that they will always be centered by the fitting of the male shells of the upper mold-section with the female shells of the lower section. Second, that the molds can be kept always in perfect condition by replacing any defective shells by new shells; third, that the molds can be made and used either as single, individual molds, or combined as so-called "gang-molds," so that considerable time is saved in the use of the same. The main point of advantage, however, consists in the facility with which the improved molds can be handled, owing to their comparative light weight as compared with the heavy, clumsy molds heretofore used.

By substituting my improved molds for the heavy cast-metal molds heretofore in use, the vulcanizing work to be done in factories making hollow rubber articles, is greatly facilitated and cheapened, inasmuch as the cost of making and maintaining the molds is reduced to a great extent, while the articles manufactured by the improved molds are superior to those made in the old style molds.

Having thus described my invention, I claim as new and desire to secure by Letters Patent:

1. A mold for making rubber articles, which comprises two supporting-frames or sections provided with openings, shells seated in said openings, the shells of one frame fitting into the shells of the other frame, and means for locking the frames together.

2. A mold for making rubber articles comprising a heat-conducting and resisting metallic supporting frame having a plurality of openings each provided with an annular seat at its upper end, detachable heat-conducting and resisting soft metallic shells extending in said openings respectively and provided with annular shoulders seated in said seats respectively, the lower part of said shells being spaced from the walls of the openings, and means for closing the upper ends of the shells.

3. A mold for making rubber articles, comprising supporting frames having a plurality of oppositely arranged openings and shells in said openings spaced from the walls of the same and adapted to seal each other when the supporting frames are opposed.

In testimony, that I claim the foregoing as my invention, I have signed my name in presence of two subscribing witnesses.

WILLIAM EGGERS.

Witnesses:
 PAUL GOEPEL,
 JOHN MURTAGH.

---

Copies of this patent may be obtained for five cents each, by addressing the "Commissioner of Patents, Washington, D. C."